United States Patent [19]

Ray

[11] 4,016,833
[45] Apr. 12, 1977

[54] MODULAR ANIMAL CAGE
[75] Inventor: Ronald C. Ray, Edgewater, Md.
[73] Assignee: Tech Serv Inc., Beltsville, Md.
[22] Filed: July 24, 1975
[21] Appl. No.: 598,870
[52] U.S. Cl. .............................................. 119/17
[51] Int. Cl.² ...................................... A01K 1/02
[58] Field of Search ................. 119/17, 19, 20, 18
[56] References Cited

UNITED STATES PATENTS

| | | | |
|---|---|---|---|
| 2,388,157 | 10/1945 | Kerr | 119/17 X |
| 2,515,084 | 7/1950 | Harris | 119/20 |
| 2,857,880 | 10/1958 | Stone, Jr. | 119/17 |

Primary Examiner—Hugh R. Chamblee
Attorney, Agent, or Firm—Cushman, Darby & Cushman

[57] ABSTRACT

A modular animal cage that may be formed to enclose an area of any given size and which may be used for a wide variety of purposes. A skeletal module is formed by four upstanding corner post members interconnected by eight horizontally extending rods disposed in sets of two. A cage may be formed from the skeletal module by clipping side panels onto the rods forming the sides of the skeletal module. Top and bottom panels may also be provided. The area enclosed by the cage can be expanded by connecting one or more other skeletal modules together in side-by-side open communication.

10 Claims, 3 Drawing Figures

MODULAR ANIMAL CAGE

BACKGROUND AND SUMMARY OF THE INVENTION

There is a need in medical and environmental research, and for many other purposes, for animal cages that may be readily assembled and disassembled, that may be enlarged to encompass variously sized areas, and that have side panels thereof adapted to receive measuring and testing equipment and the like as desired. According to the present invention, a modular animal cage is provided that may be readily assembled and disassembled and enlarged to encompass variously sized areas, and has specially adapted interchangeable side panels.

According to the present invention, four elongated upstanding corner post members interconnected by pairs of vertically spaced horizontally extending rods form a skeletal module having a general rectangular prism outline configuration. A cage may be formed from such a skeletal module by placing side panels on the sides thereof by clipping them to the horizontally extending rods, and a bottom and top may be provided if desired. The side panels may take a variety of forms, and may have openings formed therein for receipt of sensing or indicating components or the like, or may have such components formed therewith. Attachment of the side panels to the skeletal module is accomplished by resilient clip members disposed on the outside faces of the panels for receiving the horizontally extending rods of each skeletal side therein.

To expand a cage to any desired size, it is merely necessary to connect as many skeletal modules as desired together in open communication. This may be accomplished by placing a skeletal side of a first skeletal module adjacent to a skeletal side of a second skeletal module (with the adjacent corner posts thereof abutting) and holding them together with plates having spring clips formed on the undersurface thereof, which spring clips receive adjacent rods of the skeletal modules. Such plates provide a smooth transition between the skeletal modules.

While many prior art cage structures are known, none have the same type of modular components that are readily assembled and disassembled to provide as wide a variety of enclosures as the cage according to the present invention. For instance, some prior art cages require specially shaped base members therefor, having special structures formed therewith (see U.S. Pat. Nos. 3,389,686, 3,516,389 and 3,774,576 for example) which limits the configuration, size, and function of a cage that may be formed thereby. Other prior art constructions include complicated interlocking structures or do not provide for cages that may be readily enlarged or have specialty components attached thereto, or are not as easy to manufacture or sturdy as a cage according to the present invention. Exemplary prior art devices are disclosed in U.S. Pat. Nos. 1,031,359, 3,381,664, 3,494,330, 3,791,347 and 3,830,201.

The primary object of the present invention is to provide a modular animal cage that may be readily and easily assembled to form an enclosure of any given size and is specially adapted for a wide variety of uses. This and other objects of the invention will become clear from an inspection of the detailed description of the invention and from the appended claims.

BRIEF DESCRIPTION OF THE INVENTION

DETAILED DESCRIPTION OF THE INVENTION

Figure 1:
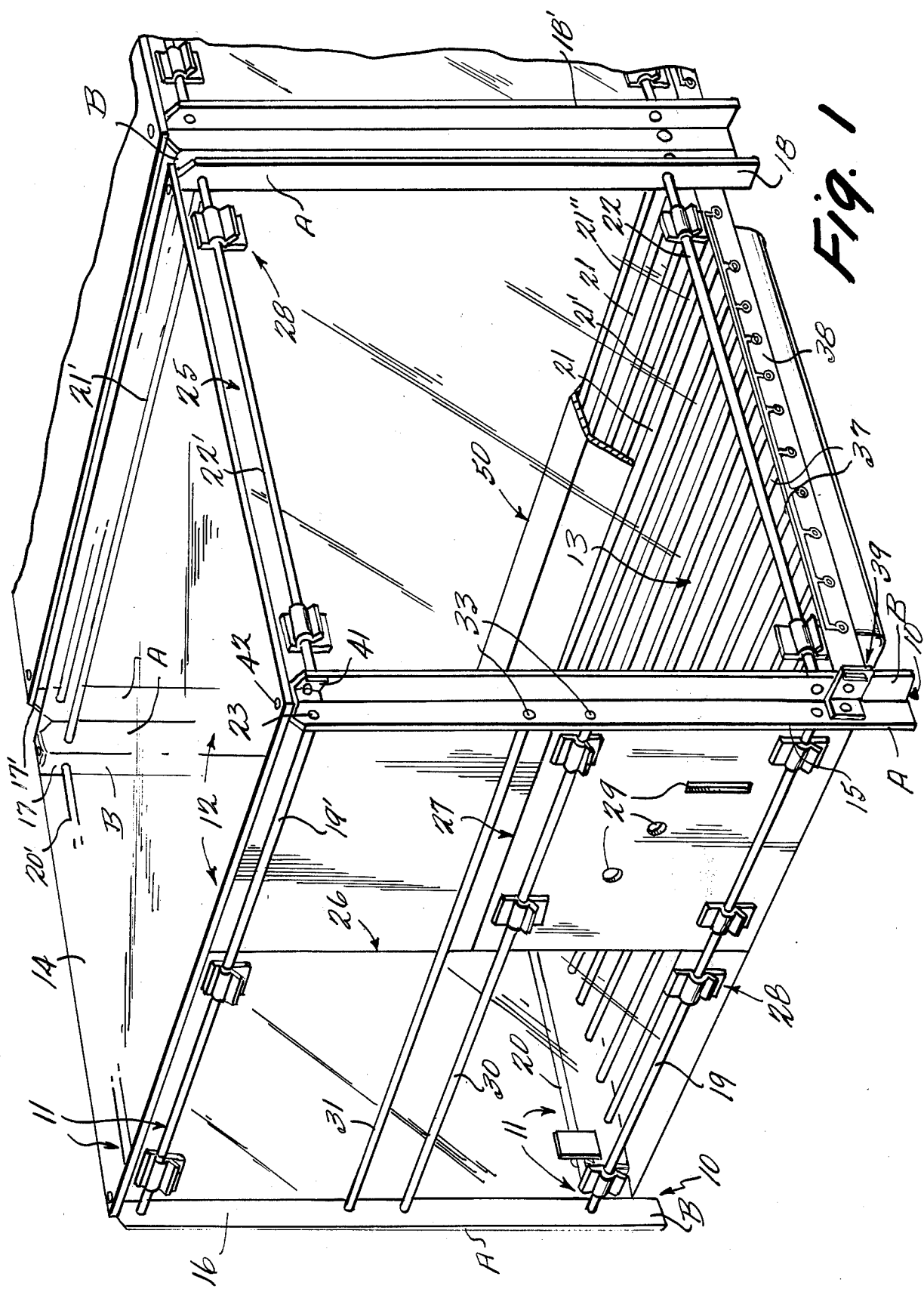
FIG. 1 is a perspective view of an exemplary assembled modular cage according to the present invention.

The invention provides for modular construction of an animal cage and the major components thereof including a plurality of side post members, shown generally at 10 in the drawings, a plurality of horizontally extending rods, shown generally at 11 in the drawings, for interconnecting the post members 10 together to form a skeletal cage module, and a plurality of side panel members (which may take a variety of forms), shown generally at 12 in the drawings. Normally a bottom 13 and a top 14 are also provided to provide a completely contained cage. Provisions are also made for connecting skeletal modules together to form any size cage structure.

According to the preferred embodiment of the present invention illustrated in the drawings, four upstanding corner post members 10 are provided, each post member 15, 16, 17 and 18 being of relatively rigid material and vertically upstanding. It is preferred that each post member be an angle member, having portions A and B thereof disposed at approximately 90° with respect to each other, and each portion A, B for cooperation with a plurality of rods 11 for connecting the post member to an adjacent post member. Preferably there are two vertically spaced generally horizontally extending rods 11 extending between each post member and each of two adjacent post members 10. The length of the rods 11 determine the spacing between adjacent post members and provide the skeletal sides of the outline of the cage formed. As shown in the drawings, rods 19 and 19' are attached to portion A of post 15 and to portion B of post 16, rods 20 and 20' are attached to portion A of post 16 and portion B of post 17, rods 21 and 21' are attached to portion A of post 17 and portion B of post 18, and rods 22 and 22' are attached to portion A of post 18 and portion B of post 15. Attachment between the rods 11 and posts 10 may be by any suitable means, such as screws 23 extending through openings formed in the angled portions A, B of posts 10 and extending into receiving openings within the rods 11. It will be seen that the posts 15, 16, 17 and 18 interconnected by rods 19, 19' 20, 20', 21, 21' and 22, 22' form a skeletal module (of a general rectangular prism outline configuration) used in constructing a cage according to the present invention.

For providing side walls for enclosing the cage to be constructed a plurality of panels 12 are provided. The panels 12 may take a variety of forms depending upon the ultimate use for the cage and the type of animal to be caged therein. For instance panel types 25, 26 and 27 may be provided. Panel 25 is a transparent panel made of plexiglas or the like that is large enough to cover a whole side of the skeletal module to which it is connected, thereby forming a side wall thereof. Panel 26 is so dimensioned that it only covers half of a side of the skeletal module to which it is connected so that receipt of other specialty panel members on the other half of that side of the skeletal module is provided. Panel member 27 is an opaque panel formed of prepainted aluminum or the like and extends only half-way up the side of the skeletal module to which it is connected, and it is attached to rod 19 and an intermediate rod 30. Intermediate rod 30 may also be affixed to portion A of post 15 and portion B of post 16, as by screws 33 passing through openings in portions A and B received by the rod 30. A rod 31 may also be provided for attachment of a side panel member in conjunction with rod 19' above the panel 27 on the same side of the skeletal module. The panels may have openings, such as openings 29, formed therein for receipt of various devices depending upon the ultimate use of the cage; for instance, a feeding or water tube or tray may be inserted therethrough (or formed integrally with a panel portion), or a wide variety of sensing and indicating devices when the cage is to be used for medical or environmental research or the like. Panels of other configuration and materials may of course also be provided.

Figure 2:
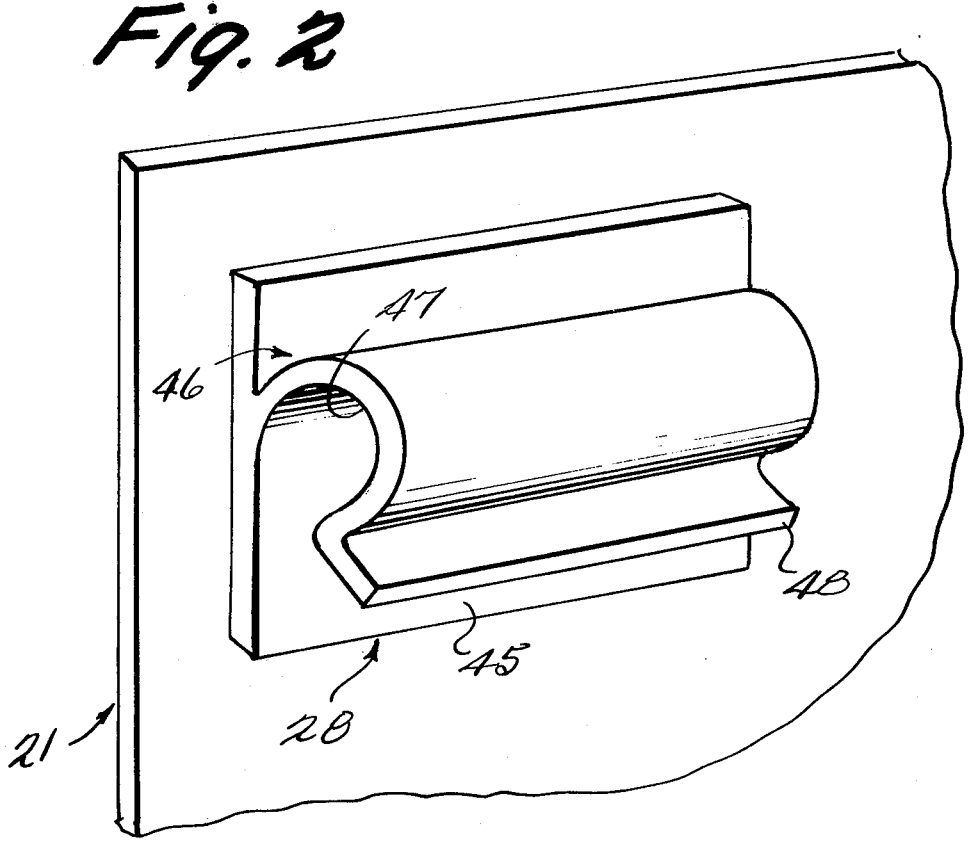
FIG. 2 is an enlarged perspective view of a spring clip for connecting side panels to horizontal rods in a cage as shown in FIG. 1.

Means are provided — a fastener device — associated with each panel 12 for securely but readily detachably attaching the panel to a pair of spaced rods 11. Exemplary means for such a purpose are shown generally at 28 in the drawings. FIG. 2 is an enlarged perspective view of an exemplary attaching means 28, which means may include a plate member 45 affixed to a panel 12 (preferably on the outside face thereof) near a corner thereof, and an extension 46 of resilient material extending outwardly from the body 45. The extension 46 has a semicircular receiving portion 47 thereof for receipt of a rod 11 therein, the portion 47 generally dimensioned so that more than half of the circumference of a rod 11 is encircled by means 28. A cam portion 48 extends outwardly and downwardly from the portion 47 and facilitates flexing of the portion 47 when the means 28 is brought into engagement with a rod 11 from a position above the rod. Although a clamping force is provided by means 28 holding a panel 12 in engagement with a rod 11 though acted on by side forces, the panel members 12 may be disengaged from the skeletal module by movement in an upward direction. The means 28 may be an integral piece of resilient plastic if desired, comprising a spring clip.

A cage constructed according to the present invention may also have bottom and top members associated therewith. An exemplary bottom member is shown generally at 13 in the drawings, and may comprise a plurality of cross members 37 interconnected by support members 38 or the like. Bottom member 35 may be connected to the skeletal module in any suitable manner, such as by pin and hole-in-bracket connections, shown generally at 39, and is preferably arranged so that the bottom edges of panels 12 abut the top thereof. In such a case, the support portions 38 would be disposed exteriorly of the panels 25. A plurality of electrical connections or printed circuits may be provided on the surface of portions 38 if desired for operative attachment of various electronic measuring or testing instruments or the like.

An exemplary top for a cage according to the present invention is shown at 14 in the drawings. Such a top may take a variety of forms such as a plexiglas sheet merely laid on top of the post members 15, 16, 17 and 18, or connected thereto by clips 42 of top 14 received by receiving structures 41 located between the angled portions A, B of various post members 10. The top 14 with such clips is hinged; when two clips are disconnected the top may be pivoted about the other two clips. With tight fitting component parts a closed controllable environment may be provided.

Figure 3:
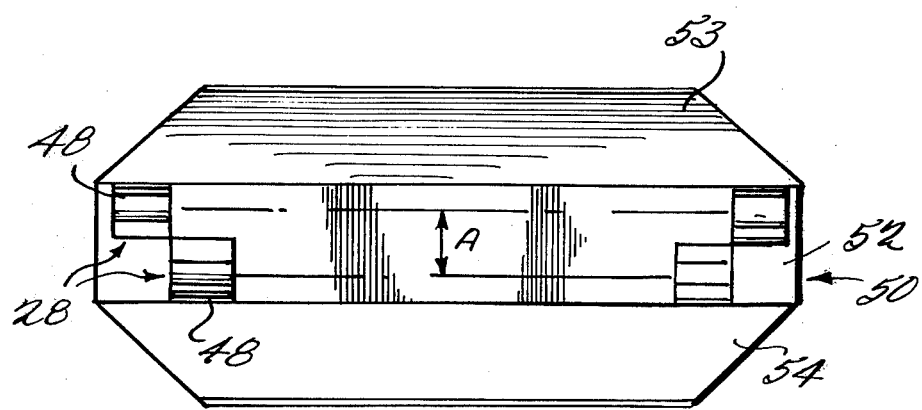
FIG. 3 is a frontal view of the outer faces of an element for connecting together various skeletal modules of the cage according to the present invention.

According to an advantageous feature of the present invention a number of skeletal modules may be connected together to define cages of any desired size, communication between various modules being provided. To facilitate the connection of skeletal modules together and to provide smooth gradual transition therebetween, elements 50 or the like may be utilized. As shown in FIGS. 1 and 3, each element 50 may take the form of a plate middle portion 52 having tapered plate side portions 53 and 54 extending at an angle thereto from either side thereof. On the face of plate middle portion 52 encompassed by the sloping side portions 53 and 54 are disposed a plurality of clamping means 28 arranged in two lines spaced from each other a distance C. To fasten a pair of skeletal modules together (as shown for rods 21 and 21'' in FIG. 1), one pair of clamping means of member 50 are clamped on one rod (21) of a first skeletal module, and the other pair of clamping means 28 are clamped on a corresponding rod (21'') of an adjacent skeletal module. The distance C, between the pairs of clamping members 28 is arranged so that the cooperating post members (17, 17' and 18, 18' in the drawings) connected to the rods being clamped abut each other when the member 50 clamps the rods (21, 21'') together. It is preferred that when the bottom rods of a side of a pair of adjacent skeletal modules are clamped together that the upper rods thereof also be clamped together with a means 50. It will be seen that the means 50 provide for an even transition between the area enclosed by one module and the next. By so connecting various modules together a cage of any desired size for performing any type of experiments or the like may be provided.

While the invention has been herein shown and described in what is presently conceived to be the most preferred and practical embodiment, it will be apparent to those of ordinary skill in the art that many modifications may be made thereof within the scope of the invention, which scope is not to be limited except by the appended claims.

What is claimed is:

1. A modular animal cage comprising
   a. four elongated upstanding corner post members,
   b. eight rods arranged in sets of two, said two rods of each set being vertically spaced from each other to provide an upper rod and a lower rod, and extending generally horizontally between and connecting a corner post member to an adjacent corner post member, each set of rods forming a skeletal side,
   c. said rods and post members together comprising a first skeletal module having a general rectangular prism outline configuration,
   d. a panel member forming a side wall portion, and
   e. resilient fastening means for readily detachably connecting said panel member to each of the rods of a set, said means comprising a fastener device on said panel for receiving the upper of the two rods of a set, and a fastener device on said panel for receiving the lower of the two rods of a set.

2. A modular animal cage as recited in claim 1 further comprising a bottom panel and means for attaching said bottom panel to said skeletal module.

3. A modular animal cage as recited in claim 2 wherein said means for connecting said bottom panel to said skeletal module comprises a plurality of pins mounted on said bottom panel and received by brackets attached to said corner post members.

4. A modular animal cage as recited in claim 2 further comprising a top panel and means for attaching said top panel to said skeletal module.

5. A modular animal cage as recited in claim 1 wherein each of said fastener devices comprises a spring clip including a body member, a resilient member extending from said body member and formed in a generally semicircular surface configuration for receiving a rod and having a free end and a cam member formed on said free end of said resilient member.

6. A modular animal cage as recited in claim 1 further comprising a second skeletal module formed by four upstanding elongated corner posts and eight generally horizontally extending rods connecting said posts, and means for connecting a skeletal side of said first skeletal module to a skeletal side of said second skeletal module for providing free communication therebetween along said sides.

7. A modular animal cage as recited in claim 6 wherein said means for connecting said skeletal modules together comprise a connecting member having a plate middle portion and four spring clips disposed on one face thereof in two pairs, each clip of each pair being in line with the other clip of the pair for receiving a rod therewith, and said pairs being spaced from each other, each pair receiving a rod of each of said first and second skeletal modules, and sloping side plate portions disposed on either side of said middle plate portion and sloping so as to encompass said face of said middle portion having spring clips disposed thereon.

8. A modular animal cage as recited in claim 1 wherein each of said corner post members comprises an angle member having two faces disposed at substantially 90° with respect to each other.

9. A modular animal cage as recited in claim 8 wherein the rods of first set of rods forming one skeletal side adjacent each corner post member are connected to one of said angle faces of the post member and the rods of a second set of rods forming another skeletal side adjacent the corner post member are connected to the opposite angle face to which said first set of rods is connected.

10. A modular animal cage as recited in claim 1 further comprising two more rods, said rods being disposed generally horizontally and extending between adjacent post members intermediate the rods of the set of rods connecting said post members together.

* * * * *